Patented Dec. 27, 1938

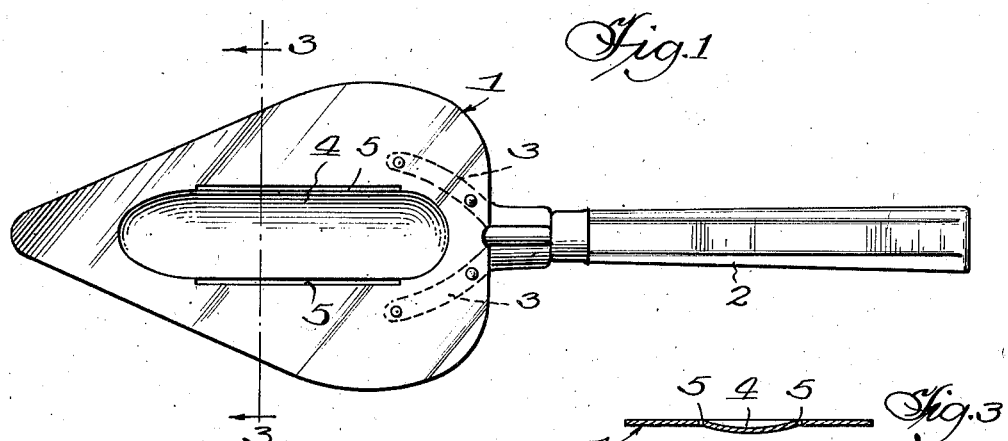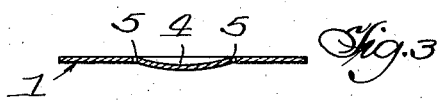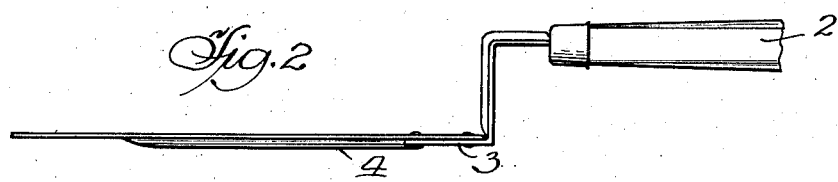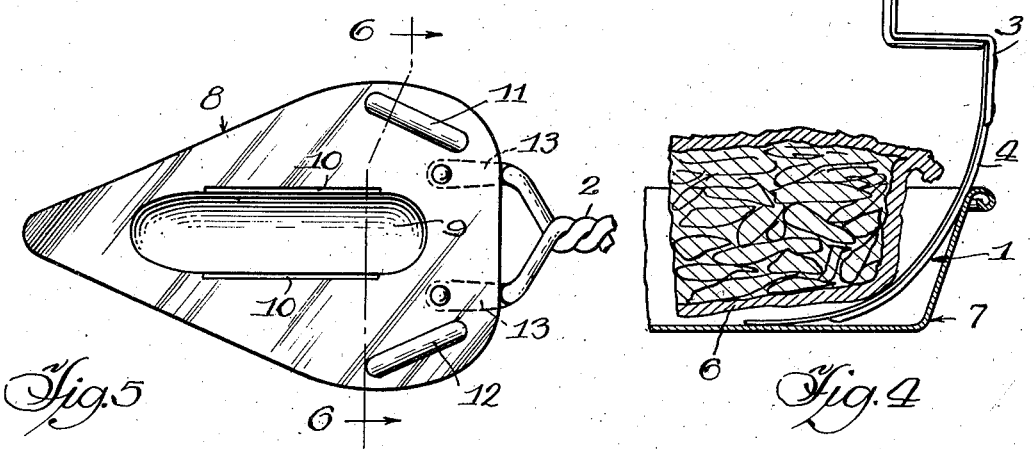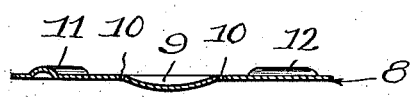

2,141,223

UNITED STATES PATENT OFFICE 2,141,223

CULINARY UTENSIL

Conrad Pistorius, Chicago, Ill.

Application January 22, 1937, Serial No. 121,771

3 Claims. (Cl. 294—7)

The present invention relates to a novel improvement in a culinary utensil and more particularly to such a construction adapted for use as a pie server or the like.

Among the objects of the present invention is to provide a novel construction of kitchen utensil having a blade formed of thin metal and so constructed and arranged as to be capable of readily bending in but one direction.

A further object of the invention is to provide a novel blade construction for a culinary utensil such as a pie server or the like, in which the blade is of spring metal so shaped or formed that it will readily bend in one direction to follow the angle and contour of a pie plate, pan or other receptacle, for lifting and transporting the contents thereof, but will resist bending in the other direction even under the weight of the object being served or removed.

A still further object of the present invention is the provision of a novel blade construction having a centrally located concaved portion with slots parallel to the sides of this concavity, whereby the blade may be readily bent or distorted in but one direction and will resist bending or distortion in the other. A further advantage of this type of construction is that even though the blade is made of very thin metal and contains considerable inherent strength, by slotting the blade along the edges of and longitudinally of the concavity, there are no shoulders or sharp angles which would tend to weaken or decrease its inherent strength and permit a buckling and cracking of the metal after a period of use.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a plan view of my novel construction.

Fig. 2 is a view in side elevation thereof.

Fig. 3 is a view in vertical cross section taken in a plane represented by the line 3—3 of Fig. 1.

Fig. 4 is a fragmentary view in side elevation of the novel device showing the method of insertion under a piece of pie or the like and the contour which the blade assumes.

Fig. 5 is a plan view of an alternate form of blade.

Fig. 6 is a view in vertical cross section taken on the irregular line 6—6 of Fig. 5.

Referring to the disclosure in the drawing and more particularly to the device shown in Figs. 1 to 4 inclusive, the novel utensil there shown comprises a wedge-shaped blade 1 having a handle 2, suitably affixed thereto by means of spaced arms or projections 3 riveted or otherwise attached to the blade. This blade is formed of spring or flexible metal and may be of any desirable shape or contour suitable for the purpose, and is provided with a centrally disposed concavity or indentation extending through a considerable portion of its length. It will be readily apparent that this type of construction permits the blade to bend freely in but one direction as shown in Fig. 4, and will greatly resist bending in the opposite direction.

In order to increase the inherent strength of this construction and prevent the blade from buckling and in time cracking, I provide a slot 5 at each edge or shoulder of the concaved portion and extending through a considerable part of its length. This eliminates the danger of cracking due to any sharp bends or angles between the concaved portion and body of the blade. In order to further strengthen the blade, the arms or projections 3 preferably extend beyond the rear end of the concavity 4, as clearly shown in Fig. 1.

In Fig. 4 is disclosed the manner or method of inserting the blade under a piece of pie 6 and the shape which the blade assumes in following the contour of the pan or plate 7.

In Figs. 5 and 6 is disclosed an alternate form of blade 8, which in outer contour, may be similar to that shown in Fig. 1. In addition to the depression or central concavity 9 and slots 10, I provide angularly arranged embossed or raised portions 11 and 12, while the arms or projections 13 of the handle which are attached to the blade, need not extend to a point where they overlap a portion of the depression or concavity 9, but merely overlap or extend beyond the rear end of the raised portions 11 and 12. It is found that this arrangement adds strength and rigidity to the blade, eliminates all danger of a weak spot adjacent the rear portion of the blade and limits and confines the zone of bending to that intended for the purposes specified.

It will be readily evident from the above description and the disclosure in the drawing, that the present device fills a long felt want in culinary utensils, particularly as to a structure such as a pie server or the like which should be of relatively light, flexible metal capable of following the contour of a pan or plate and bending in one direction, but resisting bending in the other direction. Due to its extreme flexibility and thinness it is possible to readily insert the blade under any article even though such article tends to adhere to the surface of a kitchen utensil, and due to its rigidity in the other direction, the article may be lifted and removed without danger of the blade buckling by reason of the weight of the article.

Having thus disclosed the invention, I claim:

1. In a culinary utensil, a blade therefor formed of flexible metal having a longitudinally arranged depression permitting the blade to bend freely in an upward direction to be readily inserted under an article and follow the contour of a pan, plate or other cooking or baking receptacle, and to resist bending in a downward direction to permit separating and lifting the article from the receptacle, and a slot extending along the opposite sides of the depression for preventing buckling of the blade when bent in an upward direction.

2. In a culinary utensil, a blade therefor formed of thin flexible material having a centrally arranged depression and slots parallel thereto which permit the blade to readily flex in one direction but resist flexure in the opposite direction.

3. In a culinary utensil, a blade therefor formed of thin flexible metal having a longitudinally arranged concavity, and longitudinally arranged slots provided at the junction of the concavity and body of the blade, said concavity and slots permitting the blade to bend freely in but one direction and preventing the blade from buckling and cracking due to such bending.

CONRAD PISTORIUS.